(12) United States Patent
O'Brien et al.

(10) Patent No.: US 8,375,374 B2
(45) Date of Patent: Feb. 12, 2013

(54) PARTITIONING PROGRAMS BETWEEN A GENERAL PURPOSE CORE AND ONE OR MORE ACCELERATORS

(75) Inventors: John Kevin Patrick O'Brien, South Salem, NY (US); Kathryn M. O'Brien, South Salem, NY (US); Daniel A. Prener, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 1285 days.

(21) Appl. No.: 12/127,395

(22) Filed: May 27, 2008

(65) Prior Publication Data

US 2008/0256521 A1  Oct. 16, 2008

Related U.S. Application Data

(63) Continuation of application No. 11/339,592, filed on Jan. 25, 2006.

(51) Int. Cl.
*G06F 9/45* (2006.01)

(52) U.S. Cl. ........ 717/149; 717/154; 717/156; 718/104; 718/105

(58) Field of Classification Search ........................ None
See application file for complete search history.

(56) References Cited

U.S. PATENT DOCUMENTS

| | | | |
|---|---|---|---|
| 5,261,095 A | 11/1993 | Crawford et al. | |
| 5,485,616 A | 1/1996 | Burke et al. | |
| 5,999,734 A * | 12/1999 | Willis et al. | 717/149 |
| 6,240,549 B1 | 5/2001 | Hamada et al. | |
| 6,748,019 B1 * | 6/2004 | Lin et al. | 375/240.24 |
| 6,934,935 B1 | 8/2005 | Bennett et al. | |
| 7,103,881 B2 | 9/2006 | Stone | |
| 7,478,376 B2 | 1/2009 | O'Brien et al. | |
| 7,487,496 B2 | 2/2009 | O'Brien et al. | |
| 2004/0111715 A1 * | 6/2004 | Stone | 717/148 |
| 2007/0174828 A1 | 7/2007 | O'Brien et al. | |

OTHER PUBLICATIONS

Appeal Brief filed May 4, 2011, U.S. Appl. No. 11/339,592, 28 pages.
Final Office Action mailed Jan. 5, 2011 for U.S. Appl. No. 11/339,592; 11 pages.
U.S. Appl. No. 11/339,592.
Rau, B. Ramakrishna et al., "Machine-Description Driven Compilers for EPIC Processors", Presented at the 3rd International Workshop on Code Generation for Embedded Processors, Witten Germany, Mar. 4-6, 1998, 83 pages.
Examiner's Answer mailed Jul. 22, 2011 for U.S. Appl. No. 11/339,592; 17 pages.
Reply Brief filed Sep. 22, 2011, U.S. Appl. No. 11/339,592, 11 pages.

(Continued)

*Primary Examiner* — Jason Mitchell
(74) *Attorney, Agent, or Firm* — Francis Lammes; Stephen J. Walder, Jr.; Matthew B. Talpis

(57) ABSTRACT

An mechanism is provided for partitioning programs between a general purpose core and one or more accelerators. With the apparatus and method, a compiler front end is provided for converting a program source code in a corresponding high level programming language into an intermediate code representation. This intermediate code representation is provided to an interprocedural optimizer which determines which core processor or accelerator each portion of the program should execute on and partitions the program into sub-programs based on this set of decisions. The interprocedural optimizer may further add instructions to the partitions to coordinate and synchronize the sub-programs as required. Each sub-program is compiled on an appropriate compiler backend for the instruction set architecture of the particular core processor or accelerator selected to execute the sub-program. The compiled sub-programs and then linked to thereby generate an executable program.

25 Claims, 4 Drawing Sheets

OTHER PUBLICATIONS

Interview Summary mailed Oct. 13, 2010 for U.S. Appl. No. 11/339,592; 3 pages.

Office Action mailed Jan. 5, 2011 for U.S. Appl. No. 11/339,592; 11 pages.

* cited by examiner

FIG. 3A

Accelerator 1 Description

Number of Functional Units: 3
Size of Memory: 256 Kb

Unit 0: Float Point
    # of Datatypes: 2
        Datatype 0: Float
            Size: 32 Bits
            SIMD Length: 4
            SIMD Stride: 1
            Latency: 2
        Datatype 1: Double
            Size: 64 Bits
            SIMD Length: 2
            SIMD Stride: 1
            Latency: 13

Unit 1: Fixed Point
    # of Datatypes: 2
        Datatype 0: Short
            Size: 16 Bits
            SIMD Length: 8
            SIMD Stride: 1
            Latency: 2
            .
            .
            .

Accelerator 2 Description

Number of Functional Units: 2
Size of Memory: 4 Mb

Unit 0: Vertex Pipeline
    # of Datatypes: 1
        Datatype 0: Vertex
        # Operations: n
            Operation 1: Projection
            Intrinsic Name: GL_xxx
            .
            .
            .

FIG. 3B

Function Characterization

Function Name: foo
    Datatypes Processed: Fixed 20%, Float 70%, Branch 10%
    SIMD Float Fraction: 90%  Stride Fractions: (1,20%), (512, 80%)
    SIMD Fixed Fraction: 0%
    Branch Predictability: High

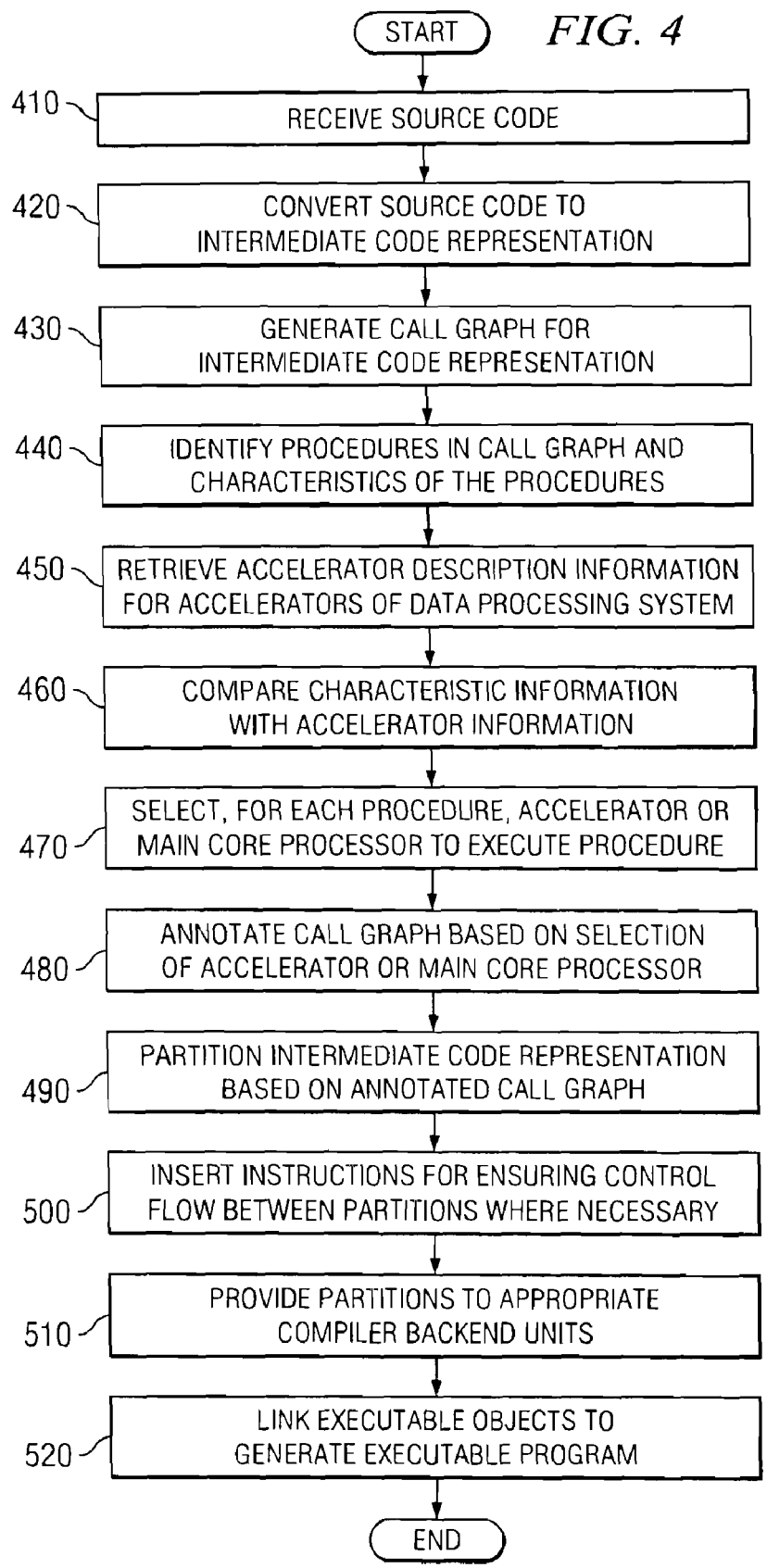

PARTITIONING PROGRAMS BETWEEN A GENERAL PURPOSE CORE AND ONE OR MORE ACCELERATORS

This application is a continuation of application Ser. No. 11/339,592, filed Jan. 25, 2006, status pending.

BACKGROUND

1. Technical Field

The present application relates generally to an improved data processing system and method. More specifically, the present application is directed to an apparatus and method for partitioning programs between a general purpose core and one or more accelerators.

2. Description of Related Art

Recently, International Business Machines, Inc. has announced the architecture for the next generation computing platform referred to as the Cell Broadband Engine Architecture (CBEA). The CBEA is comprised of a general purpose processor, or main core, that is augmented with one or more special purpose processors that may or may not have the same instruction set architecture as the main core or each other. In such a data processing environment, it is necessary to partition application programs into sub-programs that may be executed on the main core and sub-programs that may be executed on the various special purpose processors.

Typically, in order to partition a program into sub-programs, a programmer must manually partition the program. This requires a knowledge on the part of the programmer both of the program that is being partitioned as well as a knowledge of the specific main core and special purpose processors on which the partitions of the program are to be run. In addition, such partitioning may be an arduous task requiring much effort and time on the part of the programmer. Furthermore, since such partitioning relies completely on the human programmer, such partitioning is subject to human error. Moreover, if there is a change in the system architecture on which the program is to be run, the programmer may have to re-partition the program for the new architecture.

SUMMARY

The illustrative embodiments provide an apparatus and method for automatically partitioning a program into sub-programs for execution on a plurality of heterogeneous processors. In one illustrative embodiment, the apparatus and method provide a compiler for partitioning programs into sub-programs for execution on respective ones of a main core and one or more special purpose processors, hereafter referred to as accelerators.

With the apparatus and method of the illustrative embodiments, a compiler front end is provided for converting a program source code in a corresponding high level programming language into an intermediate code representation. This intermediate code representation is provided to an interprocedural optimizer which determines which core or accelerator each portion of the program should execute on and partitions the program into sub-programs based on this set of decisions. The interprocedural optimizer may further add instructions to the partitions to coordinate and synchronize the sub-programs as required.

The decisions made by the interprocedural optimizer as to which core or accelerator is to execute each portion of the program may be made, for example, based on one or more accelerator description data structures provided to the interprocedural optimizer. These accelerator description data structures may identify, for example, the various capabilities or features supported by the accelerator, the constraints and timings that govern the use of the accelerators with one or more main cores, and the like. This information may be used with a call graph generated by the interprocedural optimizer based on the intermediate code received from the compiler front end, various libraries, profile directed feedback information, and the like, to determine which procedures in the call graph should be executed on which of the main core or accelerators.

Specifically, each procedure in the complete call graph for the program is examined to determine its characteristics, e.g., a floating point procedure, what type of operation is being performed, what services the procedure may require to complete, and the like. The characteristics of the procedure are compared against the characteristics of the accelerators to determine which accelerator should handle execution of the procedure. If no accelerator is selected for handling the execution of the procedure, then the main core may be selected for execution of the procedure. Alternatively, a portion of the procedure may be extracted or outlined to form a new procedure that is assigned to the selected core or accelerator.

The call graph for the program is augmented with the new outlined procedures, if any, and the call graph is partitioned into homogenous units based on the assignment of procedures or portions of the procedures to particular ones of the main core and the accelerators. Instructions may be added to the call graph to orchestrate the flow of control among the various partitions. The homogenous units may then be provided to a compiler backend that is appropriate for the instruction set architecture of the main core or accelerator selected for that particular homogenous unit. The compiler backend then compiles the homogenous unit into optimized sub-program objects for execution on the selected main core or accelerator. These optimized sub-program objects may then be provided to a system linker, along with other third party provided objects if any, which links the optimized sub-program objects in a manner generally known in the art to generate an executable program that is partitioned for execution on a plurality of heterogeneous processors.

In one illustrative embodiment, a method for optimizing code to be run in a heterogeneous data processing environment is provided. The method may comprise generating a call graph for program code, identifying characteristics of procedures in the call graph, and comparing the characteristics of the procedures to characteristics of processing units in the heterogeneous data processing environment. The method may further comprise selecting, for each of the procedures, a processing unit to execute the procedure based on results of the comparison, partitioning the program code in accordance with the selection of processing units for each procedure, and generating executable program code based on the partitioned program code.

The method may also comprise retrieving one or more accelerator description data structures for one or more accelerators of the heterogeneous data processing environment. The characteristics of the processing units may be extracted from the one or more accelerator description data structures for comparing to the characteristics of the procedures.

Selecting a processing unit to execute the procedure based on results of the comparison may comprise extracting a portion of the procedure to form a new procedure that is assigned to the selected processing unit for processing and updating the call graph of the program code to include the new procedure.

Partitioning the program code may comprise partitioning the program code into homogenous units. Each homogenous unit may comprise instructions that are all to be performed on a same selected processing unit.

Partitioning the program code may further comprise inserting instructions into the call graph to orchestrate a flow of control among the various partitions generated by the partitioning.

Generating executable program code based on the partitioned program code may comprise providing the partitions generated during partitioning of the program code to appropriate compiler backend units which compile the partitions into optimized sub-program objects. The optimized sub-program objects may be provided to a system linker which links the optimized sub-program objects to generate an executable program. A plurality of compiler backend units may be provided for compiling partitions for different instruction sets. The partitions may be provided to respective ones of the plurality of compiler backend units based on instruction sets of the processing units that are to execute the respective partitions.

Comparing characteristics of the procedures to characteristics of processing units in the heterogeneous data processing environment may comprise, for each characteristic of a procedure, identifying a comparison rule for that characteristic. The comparison rule may identify a characteristic of a processing unit that may offer a required feature for satisfying the characteristic of the procedure. A degree of matching of each processing unit of the heterogeneous data processing environment to the characteristics of the procedure may be determined and a processing unit may be selected based on the degree of matching of each processing unit of the heterogeneous data processing environment. Selecting a processing unit may further comprise evaluating negative characteristics of the processing units, including latency, to generate a decision as to which processing units is to be used to execute a corresponding procedure.

The method may further comprise annotating the call graph based on the selected processing unit to process each procedure. Partitioning the program code may be performed based on the annotations in the annotated call graph.

The heterogeneous data processing environment may be a system-on-a-chip having at least one main core processing unit and one or more co-processor units. The at least one main core processing unit and the one or more co-processor units may have different instruction sets. In one illustrative embodiment, the heterogeneous data processing environment may comprise a main core processing unit and a plurality of synergistic processing units. The one or more accelerator description data structures may be description data structures for the plurality of synergistic processing units.

In another illustrative embodiment, a computer program product comprising a computer usable medium having a computer readable program is provided. The computer readable program, when executed on a computing device, may cause the computing device to perform the various operations described above with regard to the method illustrative embodiment.

In yet another illustrative embodiment, an apparatus for optimizing code to be run in a heterogeneous data processing environment is provided. The apparatus may comprise a processor and a memory coupled to the processor. The memory may comprise instructions that, when executed by the processor, cause the processor to perform the various operations described above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3A is an exemplary diagram illustrating an accelerator description data structure in accordance with an illustrative embodiment;

FIG. 3B is an exemplary diagram illustrating characteristics that may be extracted from procedures in a call graph in accordance with an illustrative embodiment; and FIG. 4 is a flowchart outlining an exemplary operation of an illustrative embodiment when partitioning a program into sub-programs to be executed by heterogeneous processors.

DETAILED DESCRIPTION OF THE PREFERRED EMBODIMENTS

The illustrative embodiments provide a mechanism for compiling a program such that the program is partitioned into sub-programs for execution on heterogeneous processors of a data processing system. As such, the exemplary aspects of the illustrative embodiments are preferably implemented in a data processing system having a main core processor and one or more special purpose processors, or accelerators. One such data processing system is the Cell Broadband Engine (CBE) architecture based data processing system available from International Business Machines, Inc. or Armonk, N.Y. The CBE architecture will be used as one example architecture in which the illustrative embodiments may be implemented. However, it should be appreciated that the CBE architecture is only exemplary and the use of the CBE architecture in the present description is not intended to state or imply any limitation with regard to the types of architectures or data processing systems in which the illustrative embodiments may be implemented.

Figure 1:
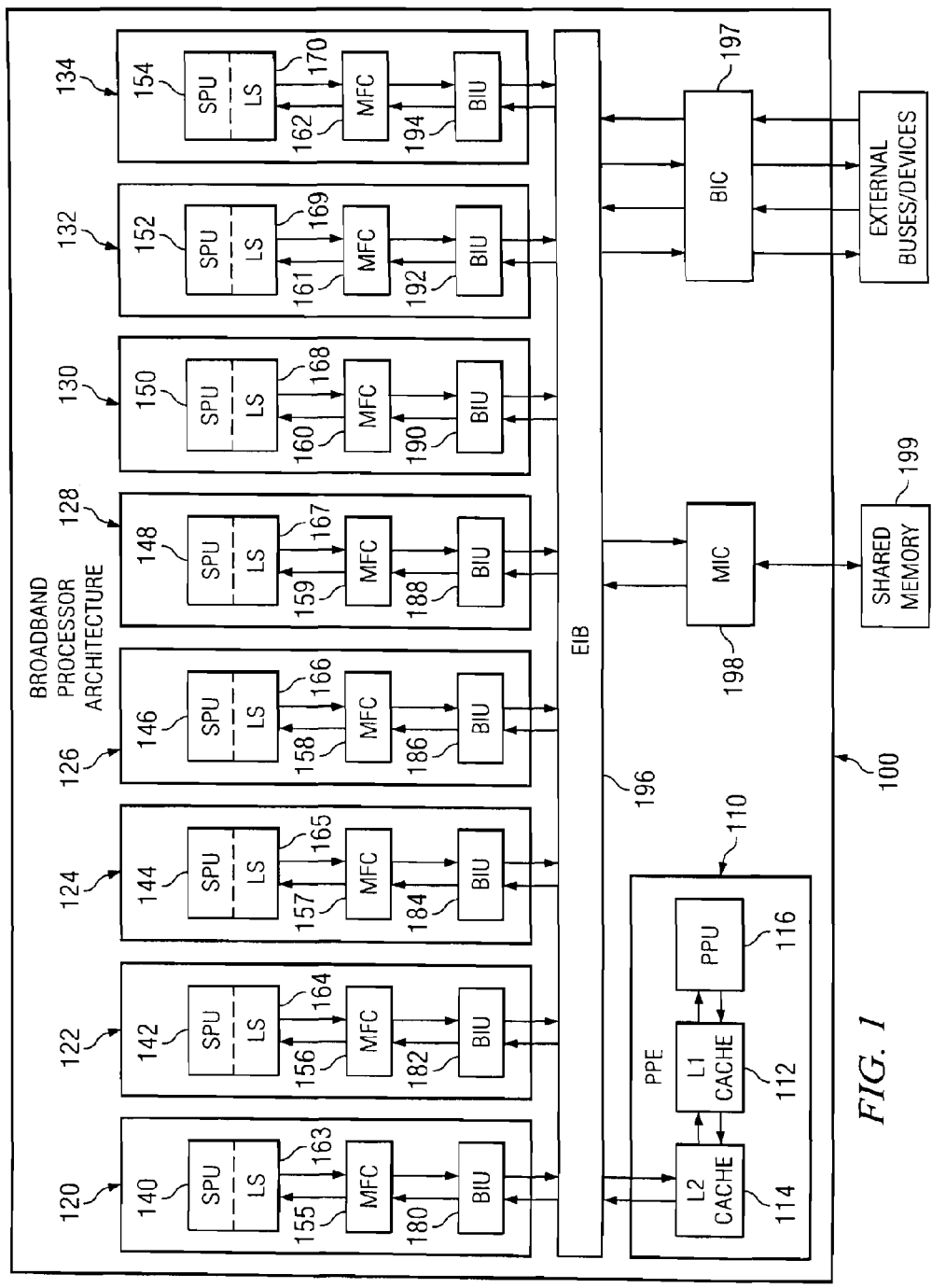
FIG. 1 is an exemplary diagram of a Cell Broadband Engine architecture in which the exemplary aspects of the illustrative embodiments may be implemented.

FIG. 1 is an exemplary block diagram of a data processing system in which aspects of the present invention may be implemented. The exemplary data processing system shown in FIG. 1 is an example of the Cell Broadband Engine (CBE) data processing system. While the CBE will be used in the description of the preferred embodiments of the present invention, the present invention is not limited to such, as will be readily apparent to those of ordinary skill in the art upon reading the following description.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance. The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

As mentioned above, the SPUs 140-154 of the SPEs 120-134 may operate using a different instruction set architecture from that of the PPU 116 of the PPE 110. Furthermore, the SPUs 140-154 may have different instruction set architectures from each other and/or may offer different services, functionality, capabilities, and the like from each other. In this way, the CBE 100 is a heterogeneous processing environment in which exemplary aspects of the illustrative embodiments may be implemented. Specifically, the PPU 116 may be provided as a main core processor while the SPUs 140-154 are special purpose processors or accelerators.

In such an environment, in order to take full advantage of the processing power afforded by the combined use of the PPU 116 and the SPUs 140-154, a program must be partitioned into sub-programs that are executable on the various ones of the PPU 116 and the SPUs 140-154. The illustrative embodiments provide a mechanism for automatically performing such partitioning of programs based on the characteristics of the main core processor (e.g., PPU 116), the accelerators (e.g., the SPUs 140-154), and the procedures of the program that is subject to partitioning.

With the mechanism of the illustrative embodiments, a compiler front end is provided for converting a program source code in a corresponding high level programming language into an intermediate code representation. This intermediate code representation is provided to an interprocedural optimizer which determines which main core or accelerator each portion of the program should execute on and partitions the program into sub-programs based on the results of this set of decisions. The interprocedural optimizer may further add instructions to the partitions to coordinate and synchronize the sub-programs as required.

The decisions made by the interprocedural optimizer as to which main core or accelerator is to execute each portion of the program may be made, for example, based on one or more accelerator description data structures provided to the interprocedural optimizer. These accelerator description data structures may identify, for example, the various capabilities or features supported by the accelerator, the constraints and timings that govern the use of the accelerators with one or more main cores, and the like. This information may be used with a call graph generated by the interprocedural optimizer based on the intermediate code received from the compiler front end, various libraries, profile directed feedback information, and the like, to determine which procedures in the call graph should be executed on which of the main core or accelerators.

Specifically, each procedure in the complete call graph for the program is examined to determine its characteristics, e.g., a floating point procedure, what type of operation is being performed, what services the procedure may require to complete, and the like. The characteristics of the procedure are compared against the characteristics of the accelerators to determine which accelerator should handle execution of the procedure. If no accelerator is selected for handling the execution of the procedure, then the main core may be selected for execution of the procedure. Alternatively, a portion of the procedure may be extracted or outlined to form a new procedure that is assigned to the selected main core or accelerator.

The call graph for the program is augmented with the new outlined procedures, if any, and the call graph is partitioned into homogenous units based on the assignment of procedures or portions of the procedures to particular ones of the main core and the accelerators. Instructions may be added to the call graph to orchestrate the flow of control among the various partitions. The homogenous units may then be provided to a compiler backend that is appropriate for the instruction set architecture of the main core or accelerator selected for that particular homogenous unit. The compiler backend then compiles the homogenous unit into optimized sub-program objects for execution on the selected main core or accelerator. These optimized sub-program objects may then be provided to a system linker, along with other third party provided objects if any, which links the optimized sub-program objects in a manner generally known in the art to generate an executable program that is partitioned for execution on a plurality of heterogeneous processors.

Figure 2:
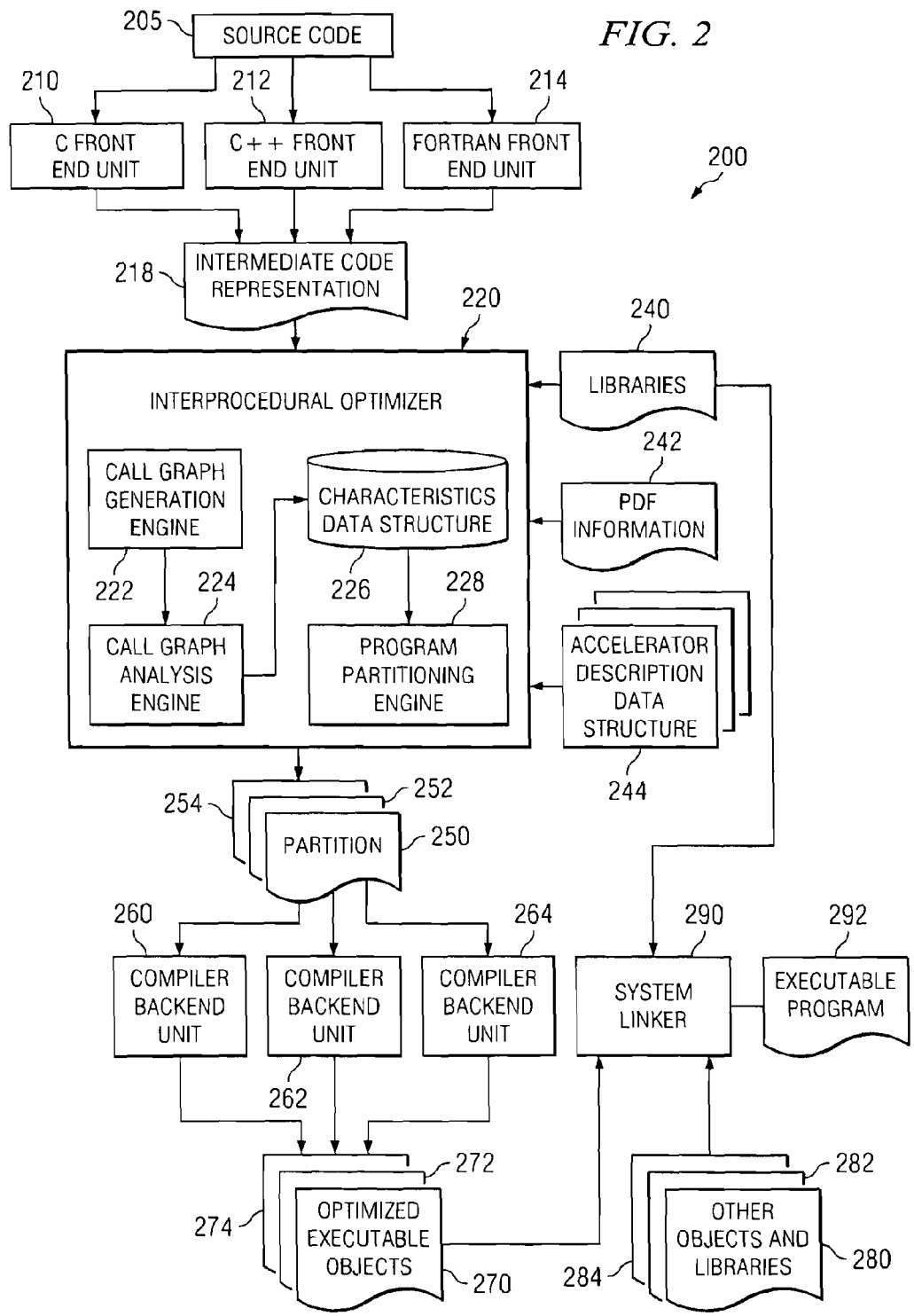
FIG. 2 is an exemplary block diagram illustrating the primary operational components of a compiler in accordance with an illustrative embodiment.

FIG. 2 is an exemplary block diagram illustrating the primary operational components of a compiler in accordance with an illustrative embodiment. The compiler 200 as shown in FIG. 2 may be executed on a data processing system such as that shown in FIG. 1, or a different type of data processing system from that of FIG. 1 without departing from the spirit and scope of the present invention. However, in accordance with the illustrative embodiments, the compiler 200 operates on source code 205 to optimize the source code for execution in a heterogeneous data processing environment, such as the heterogeneous data processing environment illustrated in FIG. 1.

As shown in FIG. 2, the compiler 200 comprises a plurality of compiler front end units 210-214 which are used to convert source code 205, which may be in various high level programming languages, into an intermediate code representation. Depending upon the particular programming language used to generate the source code 205, a particular one of the compiler front end units 210-214 is selected to perform the conversion. The conversion of source code into an intermediate code representation is generally known in the art and thus, a detailed explanation is not provided herein.

In addition, the compiler 200 includes an interprocedural optimizer 220 one purpose of which is to partition the intermediate code representation 218 of the source code program 205 into homogenous partitions which are to be executed on respective ones of a main core or an accelerator of the data processing system, e.g., CBE 100. In order to make the decisions regarding how to partition the intermediate code representation 218 of the source code program 205, the interprocedural optimizer 220 may receive as input library information 240, profile directed feedback information 242, and one or more accelerator descriptions 244 along with the intermediate code representation 218 of the source code program 205.

Based on this information, a call graph generation engine 222 of the interprocedural optimizer 220 generates a complete call graph for the intermediate code representation 218. The methodology for the generation of a call graph of a program is generally known in the art. Example systems in which call graphs are generated are described in U.S. Pat. Nos. 6,934,935, 6,240,549, and 5,485,616, for example. Since the generation of a call graph is generally known in the art, a detailed explanation of the process for generating a call graph is not provided herein.

A call graph analysis engine 224 examines each procedure in the call graph to determine its characteristics. For example, the call graph analysis engine 224 may examine the functions performed as part of the procedure to determine if floating point operations, scalar operations, or the like are required by the procedure. Similarly, the call graph analysis engine 224 may examine the procedure to determine what types of services or functions are called by the procedure. For example, if a procedure requires a service or library that is only available from the operating system, this procedure may be best run on the main core processor since, in the CBE architecture, this main core processor is the only one that runs an operating system. The various types of analysis performed by the call graph analysis engine 224 may vary depending upon the particular implementation of the illustrative embodiments as well as the target data processing system on which the program is expected to run.

From the analysis performed by the call graph analysis engine 224, characteristics for each procedure in the call graph of the intermediate code representation 218 are identified. These characteristics may be stored in a data structure 226 of the interprocedural optimizer 220 in associated with an identifier of their corresponding procedure in the call graph. This data structure 226 may then be use by the program partitioning engine 228 to partition the intermediate code representation 218 into partitions for execution on selected ones of the main core processor and the accelerators.

The program partitioning engine 228 receives the characteristics data structure 226 and compares the characteristics of each procedure in the call graph to characteristics of accelerators as set forth in the one or more accelerator description data structures 244. An accelerator description data structure 244 is a data structure that identifies the various features offered by a corresponding accelerator, its various constraints and timings that govern the use of the accelerators in conjunction with the main core processor, and other characteristic information regarding the accelerator. For example, an accelerator's description data structure 244 may indicate that the accelerator is a 4-way single instruction multiple data (SIMD) processor that can perform floating point calculations and scalar operations. Thus, if a particular procedure requires a preponderance of SIMD floating point operations intermixed with scalar operations to be performed, this accelerator may be a candidate for executing that procedure.

The characteristics of the accelerators are compared to the characteristics of the procedures to match the procedures to accelerators that provide the features required to perform the procedures. This matching operation may be performed in accordance with a set of comparison rules established in the program partition engine 228. For example, a characteristic of a procedure may be extracted from the characteristics data structure 226 and a corresponding rule for that characteristic may be identified in the program partition engine 228. The rule may designate the types of characteristics to look for in the accelerator description data structures 244 that identify accelerators that may offer the features required to satisfy that characteristic of the procedure.

The degree of matching of each accelerator may be identified by the program partition engine 228 based on the results of the application of these rules. In addition, the negative characteristics of the accelerators, e.g., constraints and timing requirements, may also be evaluated to generate a decision as to which accelerator, or the main core processor, is to be used to execute the identified procedure. Based on this identification of the accelerator or main core processor, the call graph may be annotated to identify which accelerator or main core processor is to execute that procedure in the call graph.

The process described above may be repeated for each procedure of the call graph. As a result, a fully annotated call graph is generated by the interprocedural optimizer 220 which may be used to compile the intermediate code representation 218 into optimized objects for use in generating an executable program.

It should be noted that the illustrative embodiments are not limited to selecting an accelerator or main core processor for executing an entire procedure but may be used to select an accelerator or main core processor for executing portions of a procedure. In such a case, the portion of the procedure to be executed by a selected accelerator or main core processor may be extracted or outlined to form a new procedure which is added to the call graph and assigned to the selected accelerator or main core processor.

Having annotated the call graph and augmented it with the new outlined procedures, if any, program partition engine 228 of the interprocedural optimizer 220 partitions the annotated call graph into homogeneous units or partitions. The partitions are homogeneous in that all of the instructions contained in the partition are executed by the same processor, be it a main core processor or an accelerator. This partitioning is performed based on the annotations inserted into the call graph identifying which accelerators or main core processor is to execute the corresponding procedure. From these annotations a plurality of partitions 250-254 are identified.

The program partition engine 228 may further insert instructions, where necessary, to orchestrate the flow of control among the various partitions 250-254. For example, the program partition engine 228 may insert instructions for starting up functions in libraries required by the partition, insert call instructions for creating threads on the accelerators or the main core processor and then point the thread to a portion of code corresponding to the procedure, insert an instruction for performing a direct memory access (DMA) operation to retrieve data/instructions required by the procedure, insert an instruction for performing synchronization between the procedures, or the like.

The partitions 250-254 are then provided to respective compiler backend units 260-264. The particular compiler backend unit 260-264 to which a particular partition 250-254 is sent is dependent upon the target instruction set architecture of the accelerator or main core processor that is to execute that partition 250-254. Thus, for example, if the main core processor is to execute the partition, the partition may be sent to a compiler backend unit that compiles code for execution on processors implementing a RISC instruction set architecture. If the partition is to be executed on an accelerator, the partition may be sent to a compiler backend unit that compiles code for execution on a processor that implements a vector instruction set architecture.

Thus, the particular compiler backend unit 260-264 is selected based on the particular accelerator or main core processor that is selected to execute the partition 250-254. Information from the accelerator description data structures 244, which may designate the instruction set architecture of the corresponding accelerator, may be used to perform the selection of the compiler backend unit 260-264.

The compiler backend units 260-264 compile their various partitions into optimized executable objects 270-274 that are optimized for execution on the selected accelerators and main core processor. The compilation of intermediate code representations into executable objects is generally known in the art and thus, a detailed description of this process is not included herein.

The optimized objects 270-274 are provided, along with libraries 242 and, optionally, other third party provided libraries or objects 280-284, to the system linker 290. The system linker 290 links the objects 270-274 and 280-284 together to form an executable program 292. This executable program 292 may then be loaded into a heterogeneous data processing system, such as the data processing system illustrated in FIG. 1 above, and executed in an optimized manner using the various processing resources of the different main core processor (e.g., PPU) and accelerators (e.g., SPUs).

FIG. 3A is an exemplary diagram illustrating an accelerator description data structure in accordance with an illustrative embodiment. As shown in FIG. 3A, the accelerator description data structure may contain multiple entries, each entry being for a different accelerator in the data processing system. The entry for an accelerator may comprise information identifying the number of functional units of the accelerator, the size of the memory associated with the accelerator, and specific information regarding each of the functional units of the accelerator.

The specific information for each functional unit may comprise an identifier of the functional unit, e.g., floating point, fixed point, vertex pipeline, etc., the number of data types for the functional unit and specific information regarding the different data types supported by the functional unit. The specific information for each data type may comprise a data type identifier, e.g., float, double, short, vertex, etc., a size of the supported data type, a SIMD length, a SIMD stride, and a latency. This information may be used along with characteristic information extracted from the call graph, to match accelerators with particular portions of the call graph, as previously discussed.

FIG. 3B is an exemplary diagram illustrating characteristics that may be extracted from procedures in a call graph in accordance with an illustrative embodiment. As shown in FIG. 3B, the characteristics that may be extracted for a particular function, e.g., the function "foo," may include the number or percentage of each data type processed in the function, the percentage of SIMD float operations performed, the percentage of SIMD fixed operations performed, the stride fractions, and the branch predictability. The extraction of such information from call graphs is generally known in the art and thus, a detailed explanation is not provided herein. This characteristic information may be used with the accelerator descriptions to determine which accelerators, or the main core processor, should execute the function "foo."

FIG. 4 is a flowchart outlining an exemplary operation of an illustrative embodiment when partitioning a program into sub-programs to be executed by heterogeneous processors. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

As shown in FIG. 4, the operation starts by a compiler front end receiving source code for compilation (step 410). The compiler front end converts the source code into an intermediate code representation (step 420). The intermediate code representation is provided to an interprocedural optimizer which generates a call graph for the intermediate code representation (step 430). Procedures in the call graph are identified and characteristic information about the procedures is identified (step 440).

The interprocedural optimizer retrieves accelerator description information for the accelerators of the data processing system (step 450) and compares the procedure characteristic information with the accelerator description information (step 460). Based on the comparisons, the interprocedural optimizer selects, for each of the procedures, one of the accelerators or a main core processor as a processing unit to execute the procedure (step 470). The interprocedural optimizer annotates the call graph based on the selection of the accelerators or a main core processor for each of the procedures (step 480).

The interprocedural optimizer then partitions the intermediate code representation into a plurality of partitions based on the annotated call graph (step 490). The interprocedural optimizer optionally inserts instructions for ensuring the control flow between partitions where necessary (step 500). The interprocedural optimizer provides the partitions to appropriate compiler backend units for compilation into executable objects (step 510). The executable objects are provided to a linker which links them into an executable program (step 520) and the operation ends.

Thus, the illustrative embodiments provide a mechanism for partitioning source code for optimum execution in a heterogeneous data processing environment. Based on characteristics of accelerators in the heterogeneous data processing environment and characteristics of the procedures in the source code, portions of the source code are identified for processing by selected ones of the accelerators and the main core processor. The portions of source code may then be compiled in accordance with the instruction set architectures supported by the selected accelerators and main core processors to thereby generate executable objects that are optimized for execution on the selected accelerators and/or main core processor.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for optimizing code to be run in a heterogeneous data processing environment, comprising:
    generating a call graph for program code;
    identifying characteristics of procedures in the call graph, wherein identifying the characteristics of the procedures in the call graph further comprises, for each procedure in the procedures:
        identifying functions performed as part of the procedure; and
        identifying at least one of a service or another function called by the procedure;
    comparing the characteristics of the procedures to characteristics of processing units in the heterogeneous data processing environment, wherein comparing characteristics of the procedures to characteristics of processing units in the heterogeneous data processing environment comprises:
        identifying, for each characteristic of a procedure, a comparison rule for that characteristic, wherein the comparison rule identifies a characteristic of a processing unit that may offer a required feature for satisfying the characteristic of the procedure;
        determining a degree of matching of each processing unit of the heterogeneous data processing environment to the characteristics of the procedure; and
        selecting a processing unit based on the degree of matching of each processing unit of the heterogeneous data processing environment;
    selecting, for each of the procedures, a processing unit to execute the procedure based on results of the comparison, wherein selecting a processing unit to execute the procedure based on results of the comparison comprises:
        extracting a portion of the procedure to form a new procedure that is assigned to the selected processing unit for processing, and
        updating the call graph of the program code to include the new procedure;
    partitioning the program code in accordance with the selection of the processing unit for each procedure; and
    generating executable program code based on the partitioned program code.

2. The method of claim 1, further comprising:
    retrieving one or more accelerator description data structures for one or more accelerators of the heterogeneous data processing environment, wherein the characteristics of the processing units are extracted from the one or more accelerator description data structures for comparing to the characteristics of the procedures.

3. The method of claim 1, wherein partitioning the program code comprises partitioning the program code into homogenous units, wherein each homogenous unit comprises instructions that are all to be performed on a same selected processing unit.

4. The method of claim 1, wherein partitioning the program code comprises inserting instructions into the call graph to orchestrate a flow of control among the various partitions generated by the partitioning.

5. The method of claim 1, wherein generating executable program code based on the partitioned program code comprises:
    providing the partitions generated during partitioning of the program code to appropriate compiler backend units which compile the partitions into optimized sub-program objects; and
    providing the optimized sub-program objects to a system linker which links the optimized sub-program objects to generate an executable program.

6. The method of claim 5, wherein a plurality of compiler backend units are provided for compiling partitions for different instruction sets, and wherein the partitions are provided to respective ones of the plurality of compiler backend units based on instruction sets of the processing units that are to execute the respective partitions.

7. The method of claim 1, wherein selecting a processing unit further comprises evaluating negative characteristics of the processing units, including latency, to generate a decision as to which processing units is to be used to execute a corresponding procedure.

8. The method of claim 1, further comprising:
annotating the call graph based on the selected processing unit to process each procedure, wherein partitioning the program code is performed based on the annotations in the annotated call graph.

9. The method of claim 1, wherein the heterogeneous data processing environment is a system-on-a-chip having at least one main core processing unit and one or more co-processor units, wherein the at least one main core processing unit and the one or more co-processor units have different instruction sets.

10. A computer program product comprising a computer useable medium having a computer readable program recorded thereon, wherein the computer readable program, when executed on a computing device, causes the computing device to:
generate a call graph for program code;
identify characteristics of procedures in the call graph, wherein the computer readable program to identify the characteristics of the procedures in the call graph further comprises computer readable program that causes, for each procedure in the procedures, the computing device to:
identify functions performed as part of the procedure; and
identify at least one of a service or another function called by the procedure;
compare the characteristics of the procedures to characteristics of processing units in the heterogeneous data processing environment, wherein the computer readable program causes the computing device to compare characteristics of the procedures to characteristics of processing units in the heterogeneous data processing environment by:
identifying, for each characteristic of a procedure, a comparison rule for that characteristic, wherein the comparison rule identifies a characteristic of a processing unit that may offer a required feature for satisfying the characteristic of the procedure;
determining a degree of matching of each processing unit of the heterogeneous data processing environment to the characteristics of the procedure; and
selecting a processing unit based on the degree of matching of each processing unit of the heterogeneous data processing environment;
select, for each of the procedures, a processing unit to execute the procedure based on results of the comparison, wherein the computer readable program causes the computing device to select a processing unit to execute the procedure based on results of the comparison by:
extracting a portion of the procedure to form a new procedure that is assigned to the selected processing unit for processing; and
updating the call graph of the program code to include the new procedure;
partition the program code in accordance with the selection of the processing unit for each procedure; and
generate executable program code based on the partitioned program code.

11. The computer program product of claim 10, wherein the computer readable program further causes the computing device to:
retrieve one or more accelerator description data structures for one or more accelerators of the heterogeneous data processing environment, wherein the characteristics of the processing units are extracted from the one or more accelerator description data structures for comparing to the characteristics of the procedures.

12. The computer program product of claim 10, wherein the computer readable program causes the computing device to partition the program code by partitioning the program code into homogenous units, wherein each homogenous unit comprises instructions that are all to be performed on a same selected processing unit.

13. The computer program product of claim 10, wherein the computer readable program further causes the computing device to insert instructions into the call graph to orchestrate a flow of control among the various partitions generated by the partitioning.

14. The computer program product of claim 10, wherein the computer readable program causes the computing device to generate executable program code based on the partitioned program code by:
providing the partitions generated during partitioning of the program code to appropriate compiler backend units which compile the partitions into optimized sub-program objects; and
providing the optimized sub-program objects to a system linker which links the optimized sub-program objects to generate an executable program.

15. The computer program product of claim 14, wherein a plurality of compiler backend units are provided for compiling partitions for different instruction sets, and wherein the partitions are provided to respective ones of the plurality of compiler backend units based on instruction sets of the processing units that are to execute the respective partitions.

16. The computer program product of claim 10, wherein the computer readable program further causes the computing device to select a processing unit further by evaluating negative characteristics of the processing units, including latency, to generate a decision as to which processing units is to be used to execute a corresponding procedure.

17. The computer program product of claim 10, wherein the computer readable program further causes the computing device to:
annotate the call graph based on the selected processing unit to process each procedure, wherein the computer readable program causes the computing device to partition the program code based on the annotations in the annotated call graph.

18. An apparatus for optimizing code to be run in a heterogeneous data processing environment, comprising:
a processor; and
a memory coupled to the processor, wherein the memory comprises instructions that, when executed by the processor, cause the processor to:
generate a call graph for program code;
identify characteristics of procedures in the call graph, wherein the instructions to identify the characteristics of the procedures in the call graph further comprises instructions that cause, for each procedure in the procedures, the processor to:
identify functions performed as part of the procedure; and
identify at least one of a service or another function called by the procedure;
compare the characteristics of the procedures to characteristics of processing units in the heterogeneous data processing environment, wherein the instructions cause the processor to compare characteristics of the procedures to characteristics of processing units in the heterogeneous data processing environment by:
identifying, for each characteristic of a procedure, a comparison rule for that characteristic, wherein the comparison rule identifies a characteristic of a processing unit that may offer a required feature for satisfying the characteristic of the procedure;
determining a degree of matching of each processing unit of the heterogeneous data processing environment to the characteristics of the procedure; and
selecting a processing unit based on the degree of matching of each processing unit of the heterogeneous data processing environment;
select, for each of the procedures, a processing unit to execute the procedure based on results of the comparison, wherein the instructions cause the processor to select a processing unit to execute the procedure based on results of the comparison by:
extracting a portion of the procedure to form a new procedure that is assigned to the selected processing unit for processing; and
updating the call graph of the program code to include the new procedure;
partition the program code in accordance with the selection of the processing unit for each procedure; and
generate executable program code based on the partitioned program code.

19. The apparatus of claim 18, wherein the instructions further cause the processor to:
retrieve one or more accelerator description data structures for one or more accelerators of the heterogeneous data processing environment, wherein the characteristics of the processing units are extracted from the one or more accelerator description data structures for comparing to the characteristics of the procedures.

20. The apparatus of claim 18, wherein the instructions cause the processor to partition the program code by partitioning the program code into homogenous units, wherein each homogenous unit comprises instructions that are all to be performed on a same selected processing unit.

21. The apparatus of claim 18, wherein the instructions further cause the processor to insert instructions into the call graph to orchestrate a flow of control among the various partitions generated by the partitioning.

22. The apparatus of claim 18, wherein the instructions cause the processor to generate executable program code based on the partitioned program code by:
providing the partitions generated during partitioning of the program code to appropriate compiler backend units which compile the partitions into optimized sub-program objects; and
providing the optimized sub-program objects to a system linker which links the optimized sub-program objects to generate an executable program.

23. The apparatus of claim 22, wherein a plurality of compiler backend units are provided for compiling partitions for different instruction sets, and wherein the partitions are provided to respective ones of the plurality of compiler backend units based on instruction sets of the processing units that are to execute the respective partitions.

24. The apparatus of claim 18, wherein the instructions further cause the processor to select a processing unit by evaluating negative characteristics of the processing units, including latency, to generate a decision as to which processing units is to be used to execute a corresponding procedure.

25. The apparatus of claim 18, wherein the instructions further cause the processor to:
annotate the call graph based on the selected processing unit to process each procedure, wherein the computer readable program causes the computing device to partition the program code based on the annotations in the annotated call graph.

* * * * *